United States Patent
Hayashi et al.

(10) Patent No.: US 9,527,500 B2
(45) Date of Patent: Dec. 27, 2016

(54) DRIVE CONTROL DEVICE FOR HYBRID VEHICLE

(75) Inventors: Koji Hayashi, Aichi-gun (JP); Hiroyasu Harada, Toyota (JP); Tomohito Ono, Gotenba (JP); Hiroyuki Ishii, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 71 days.

(21) Appl. No.: 14/385,825

(22) PCT Filed: Mar. 21, 2012

(86) PCT No.: PCT/JP2012/057152
§ 371 (c)(1),
(2), (4) Date: Sep. 17, 2014

(87) PCT Pub. No.: WO2013/140540
PCT Pub. Date: Sep. 26, 2013

(65) Prior Publication Data
US 2015/0051770 A1    Feb. 19, 2015

(51) Int. Cl.
  *B60W 20/10*    (2016.01)
  *B60W 20/00*    (2016.01)
  (Continued)

(52) U.S. Cl.
  CPC .............. *B60W 20/10* (2013.01); *B60K 6/365* (2013.01); *B60K 6/445* (2013.01); *B60W 10/02* (2013.01);
  (Continued)

(58) Field of Classification Search
  CPC ...... B60W 20/10; B60W 20/40; B60W 10/02; B60W 10/08; B60W 20/20; B60W 10/06; B60K 6/365; B60K 6/445; B60K 2006/4841; B60K 2006/381; Y10S 903/93; Y02T 10/6286; Y02T 10/6239
  See application file for complete search history.

(56) References Cited

U.S. PATENT DOCUMENTS 6,053,833 A    4/2000  Masaki
6,248,036 B1   6/2001  Masaki
(Continued)

FOREIGN PATENT DOCUMENTS

EP    2 055 575 A2     5/2009
JP    2003-285657 A   10/2003
(Continued)

OTHER PUBLICATIONS

International Search Report for PCT/JP2012/057152 dated Apr. 24, 2012.

*Primary Examiner* — John Q Nguyen
*Assistant Examiner* — Michael Kerrigan
(74) *Attorney, Agent, or Firm* — Sughrue Mion, PLLC

(57) ABSTRACT

A drive control device for a hybrid vehicle is provided with a differential device including four rotary elements; and an engine, first and second electric motors and an output rotary member which are respectively connected to the four rotary elements. One of the four rotary elements is constituted by a rotary component of a first differential mechanism and a rotary component of a second differential mechanism selectively connected through a clutch, and one of the rotary components is selectively fixed to a stationary member through a brake. The hybrid vehicle is selectively placed in one of drive modes including a first hybrid drive mode in which the brake is placed in an engaged state while the clutch is placed in a released state, and a second hybrid drive mode in which the brake is placed in a released state while the clutch is placed in an engaged state. The drive control device comprises: an engine stop control portion configured to switch the hybrid drive mode from the second hybrid
(Continued)

drive mode to the first hybrid drive mode, before stopping the engine according to a requirement to stop the engine in the second hybrid drive mode; a resonance restriction control portion configured to initiate positive reduction of an operating speed of the engine with an operation of the first electric motor when the operating speed of the engine has dropped below a predetermined determination value; and a torque offsetting control portion configured to control the second electric motor so as to offset a reaction force which acts on the output rotary member as a result of the positive reduction of the operating speed of the engine by the first electric motor.

4 Claims, 10 Drawing Sheets

(51) Int. Cl.
| | | |
|---|---|---|
| *B60K 6/445* | (2007.10) | |
| *B60W 10/06* | (2006.01) | |
| *B60K 6/365* | (2007.10) | |
| *B60W 10/08* | (2006.01) | |
| *B60W 10/02* | (2006.01) | |
| *B60K 6/38* | (2007.10) | |
| *B60K 6/48* | (2007.10) | |

(52) U.S. Cl.
CPC ............ *B60W 10/06* (2013.01); *B60W 10/08* (2013.01); *B60W 20/20* (2013.01); *B60W 20/40* (2013.01); *B60K 2006/381* (2013.01); *B60K 2006/4841* (2013.01); *Y02T 10/6239* (2013.01); *Y02T 10/6286* (2013.01); *Y10S 903/93* (2013.01)

(56) References Cited

U.S. PATENT DOCUMENTS

| | | |
|---|---|---|
| 2001/0008859 A1 | 7/2001 | Masaki |
| 2009/0048050 A1* | 2/2009 | Kamada .................. B60K 6/442 475/150 |
| 2011/0111906 A1 | 5/2011 | Kim et al. |
| 2012/0095635 A1 | 4/2012 | Kanno et al. |
| 2014/0194238 A1 | 7/2014 | Ono et al. |
| 2014/0194239 A1* | 7/2014 | Ono ......................... F16H 3/728 475/5 |

FOREIGN PATENT DOCUMENTS

| | | |
|---|---|---|
| JP | 2005199942 A | 7/2005 |
| JP | 2008-265600 A | 11/2008 |
| JP | 2009143306 A | 7/2009 |
| JP | 2009143377 A | 7/2009 |
| JP | 2011-09871 2 A | 5/2011 |
| WO | 2010/137653 A1 | 12/2010 |
| WO | 2013/014777 A1 | 1/2013 |

* cited by examiner

|  | BK | CL | MODE |
|---|---|---|---|
| EV-1 | O |  | 1 |
| EV-2 | O | O | 2 |
| HV-1 | O |  | 3 |
| HV-2 |  | O | 4 |
| HV-3 |  |  | 5 |

DRIVE CONTROL DEVICE FOR HYBRID VEHICLE

CROSS REFERENCE TO RELATED APPLICATIONS

This application is a National Stage of International Application No. PCT/JP2012/057152 filed Mar. 21, 2012, the contents of all of which are incorporated herein by reference in their entirety.

TECHNICAL FIELD

The present invention relates to an improvement of a drive control device for a hybrid vehicle.

BACKGROUND ART

There is known a hybrid vehicle which is provided with a differential mechanism having a first rotary element connected to a first electric motor, a second rotary element connected to an engine, and a third rotary element connected to an output rotary member and a second electric motor, and a crankshaft locking device for inhibiting a rotary motion of a crankshaft of the engine, and which can run in an electric drive mode in which the first and second electric motors both are operated as a vehicle drive power source.

PRIOR ART DOCUMENT

Patent Document

Patent Document 1: JP-2008-265600 A1

SUMMARY OF THE INVENTION

Object Achieved by the Invention

It is considered to configure a hybrid vehicle such that the hybrid vehicle is provided with: a first differential mechanism having a first rotary element connected to a first electric motor, a second rotary element connected to an engine, and a third rotary element connected to an output rotary member; a second differential mechanism which has a first rotary element connected to a second electric motor, a second rotary element and a third rotary element, and in which one of the second and third rotary elements is connected to the third rotary element of the first differential mechanism; a clutch for selectively connecting the second rotary element of the first differential mechanism, and one of the other of the second and third rotary elements of the second differential mechanism not connected to the third rotary element of the first differential mechanism, to each other; and a brake for selectively fixing the above-indicated other of the second and third rotary elements of the second differential mechanism not connected to the third rotary element of the first differential mechanism, to a stationary member. This hybrid vehicle can be run in a second motor drive mode in which the first and second electric motors are operated to drive the hybrid vehicle while the brake and the clutch are placed in an engaged state, as well as in a first motor drive mode in which the second electric motor is primarily operated to drive the hybrid vehicle while the brake is placed in the engaged state.

By the way, the hybrid vehicle configured as described above can be run in hybrid drive modes in which the engine and the first or second electric motor are operated as a vehicle drive power source. The hybrid drive modes include a first hybrid drive mode in which the brake is placed in the engaged state while the clutch is placed in a released state, and a second hybrid drive mode in which the engine is used as a vehicle drive power source and the brake is placed in a released state while the clutch is placed in the engaged state. These first and second hybrid drive modes are selectively established depending upon a speed ratio, making it possible to further improve transmission efficiency of the hybrid vehicle.

However, the above-described hybrid vehicle has a drawback of an unexpected temporary increase of a vehicle drive torque upon stopping of the engine according to a requirement to stop the engine in the second hybrid drive mode, where the engine is stopped by positively reducing an operating speed of the engine with an operation of the first electric motor, so that the engine speed rapidly drops through a resonance band. This drawback takes place because an unexpected increase of a drive torque transmitted to the output rotary member due to the positive reduction of the operating speed of the engine with the operation of the first electric motor cannot be independently offset (cancelled) by the second electric motor since the second rotary element of the first differential mechanism and one of the second and third rotary elements of the second differential mechanism which is not connected to the third rotary element of the first differential mechanism are connected to each other through the clutch.

The present invention was made in view of the background art described above. It is therefore an object of the present invention to provide a drive control device for a hybrid vehicle, which permits prevention of the unexpected increase of the vehicle drive force upon stopping of the engine in the second hybrid drive mode.

Means for Achieving the Object

The object indicated above is achieved according to the principle of the present invention, which provides a drive control device for a hybrid vehicle provided with: (a) a first differential mechanism and a second differential mechanism which have four rotary elements as a whole; and an engine, a first electric motor, a second electric motor and an output rotary member which are respectively connected to the above-described four rotary elements, and wherein (b) one of the above-described four rotary elements is constituted by the rotary element of the above-described first differential mechanism and the rotary element of the above-described second differential mechanism which are selectively connected to each other through a clutch, and (c) one of the rotary elements of the above-described first and second differential mechanisms which are selectively connected to each other through the above-described clutch is selectively fixed to a stationary member through a brake, (d) the above-described hybrid vehicle being selectively placed in one of drive modes including a first hybrid drive mode in which the above-described brake is placed in an engaged state while the above-described clutch is placed in a released state, and a second hybrid drive mode in which the above-described brake is placed in a released state while the above-described clutch is placed in an engaged state, (e) the drive control device being characterized by switching the hybrid drive mode from the above-described second hybrid drive mode to the above-described first hybrid drive mode, before stopping the above-described engine according to a requirement to stop the above-described engine in the above-described second hybrid drive mode.

Advantages of the Invention

The hybrid vehicle controlled by the drive control device according to the present invention is provided with: the first differential mechanism and the second differential mechanism which have the four rotary elements as a whole when the clutch CL is placed in the engaged state; and the engine, the first electric motor, the second electric motor and the output rotary member which are respectively connected to the four rotary elements. One of the above-described four rotary elements is constituted by the rotary element of the above-described first differential mechanism and the rotary element of the above-described second differential mechanism which are selectively connected to each other through the clutch, and one of the rotary elements of the above-described first and second differential mechanisms which are selectively connected to each other through the clutch is selectively fixed to the stationary member through the brake. The drive control device is configured to switch the hybrid drive mode from the above-described second hybrid drive mode to the above-described first hybrid drive mode, before stopping the above-described engine according to a requirement to stop the above-described engine in the above-described second hybrid drive mode. Accordingly, the second rotary element of the first differential mechanism and one of the second and third rotary elements of the second differential mechanism not connected to the third rotary element of the first differential mechanism, which have been connected to each other through the clutch, are disconnected from each other, so that the unexpected increase of the drive force transmitted to the output rotary member upon positive reduction of the operating speed of the engine with an operation of the first electric motor can be offset (cancelled) by the second electric motor an output torque of which is temporarily reduced to hold the vehicle drive torque constant. Thus, it is possible to prevent the drawback of the unexpected temporary increase of the vehicle drive torque.

According to one preferred form of the invention, the hybrid vehicle includes a manually operated device for manually selecting one of a drive position permitting the hybrid vehicle to run, and a parking position for mechanically inhibiting the running of the hybrid vehicle, and the above-described engine is stopped with the hybrid vehicle being kept in the above-described second hybrid drive mode, if the above-described parking position is selected by the above-described manually operated device. According to this form of the invention, the drive torque which is transmitted to the output rotary member and which is unexpectedly increased as a result of the positive reduction of the engine speed with the operation of the first electric motor does not cause the hybrid vehicle to be run, since the running of the hybrid vehicle is mechanically inhibited.

According to another preferred form of the invention, positive reduction of an operating speed of the above-described engine with an operation of the above-described first electric motor is initiated when the operating speed of the engine has dropped below a predetermined determination value, and the above-described second electric motor is controlled so as to offset a reaction force which acts on the above-described output rotary member as a result of the positive reduction of the operating speed of the engine by the above-described first electric motor. According to this form of the invention, the drive torque which is transmitted to the output rotary member and which is unexpectedly increased as a result of the positive reduction of the engine speed with the operation of the first electric motor does not cause the hybrid vehicle to be run, since the running of the hybrid vehicle is mechanically inhibited.

According to a further preferred form of the invention, the above-described first differential mechanism is provided with a first rotary element connected to the above-described first electric motor, a second rotary element connected to the above-described engine, and a third rotary element connected to the above-described output rotary member, while the above-described second differential mechanism is provided with a first rotary element connected to the above-described second electric motor, a second rotary element, and a third rotary element, one of the second and third rotary elements being connected to the third rotary element of the above-described first differential mechanism, and the above-described clutch is configured to selectively connect the second rotary element of the above-described first differential mechanism, and the other of the second and third rotary elements of the above-described second differential mechanism which is not connected to the third rotary element of the above-described first differential mechanism, to each other, while the above-described brake is configured to selectively fix the other of the second and third rotary elements of the above-described second differential mechanism which is not connected to the third rotary element of the above-described first differential mechanism, to the stationary member. According to this form of the invention, the drive control device can be used to control the hybrid vehicle having a highly practical arrangement.

MODE FOR CARRYING OUT THE INVENTION

Figure 1:
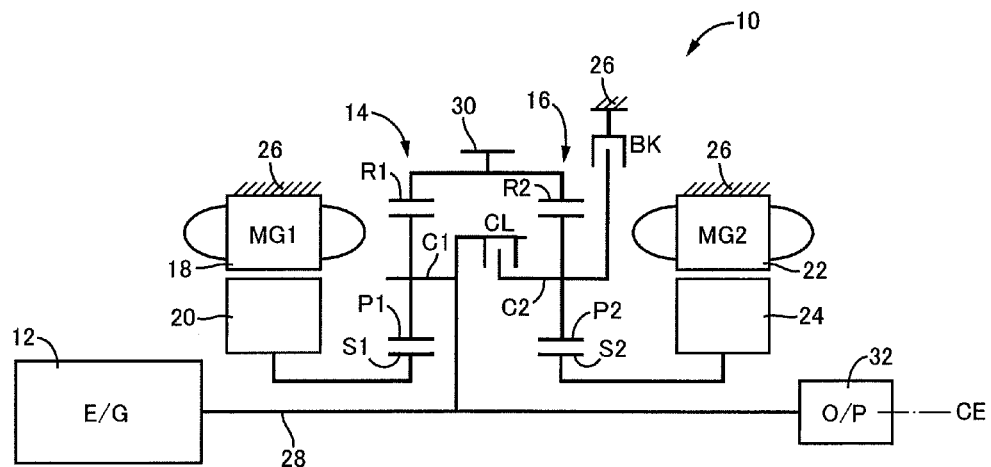
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, the engine, the first electric motor, the second electric motor and the output rotary member coupled to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source with the engine stopped include a mode 1 to be established in the engaged state of the brake and in the released state of the clutch, and a mode 2 to be established in the engaged states of both of the clutch and brake. Further, hybrid drive modes in which the above-described engine is operated while the above-described first and second electric motors are operated to generate a vehicle drive force and/or an electric energy as needed, include a mode 3 to be established in the engaged state of the brake and in the released state of the clutch, a mode 4 to be established in the released state of the brake and the engaged state of the clutch, and a mode 5 to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which is provided with rotary elements (elements) consisting of a first rotary element in the form of a sun gear S1; a second rotary element in the form of a carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio ρ2 and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is operated with an electric energy may be provided in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
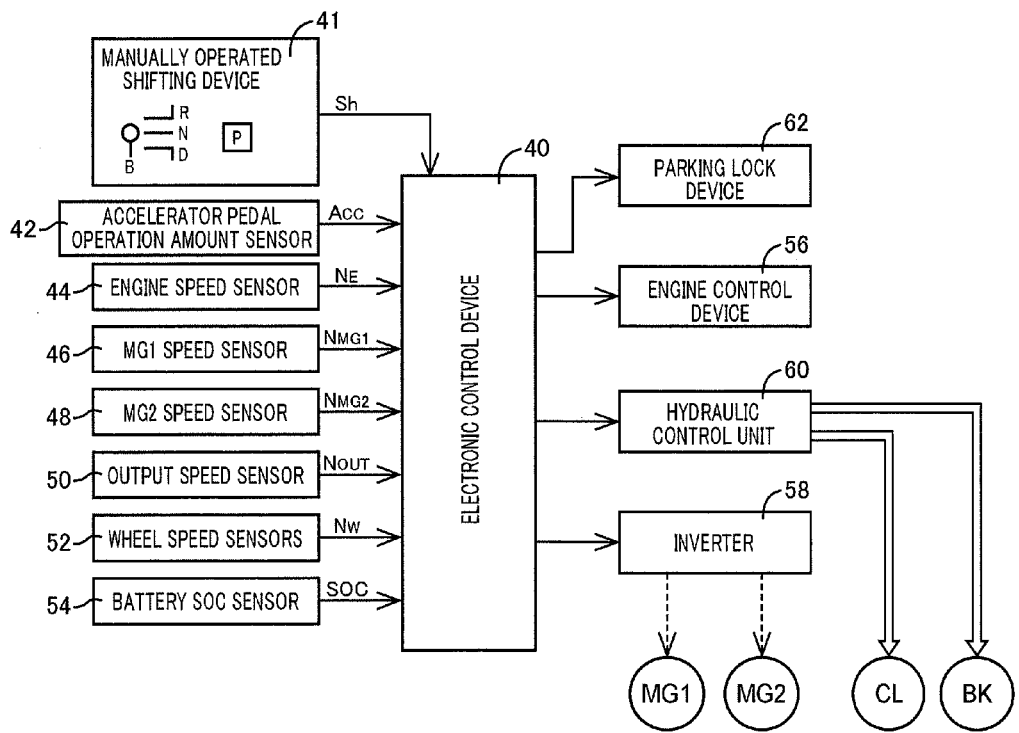
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: a shift position signal Sh generated by a manually operated shifting device 41, which is indicative of a presently selected one of a parking position, a neutral position, a forward drive position, a reverse drive position, etc.; an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of wheel speed sensors 52 indicative of rotating speeds $N_W$ of wheels in the drive system 10; and an output signal of a battery SOC sensor 54 indicative of a stored electric energy amount (state of charge) SOC of a battery not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and M2 are supplied to and stored in the battery through the inverter 58. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK. When the electronic control device 40 receives the shift position signal Sh indicative of the presently selected parking position, the electronic control device 40 applies to a parking lock device 62 a command signal for inhibiting a rotary motion of the output gear 30.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
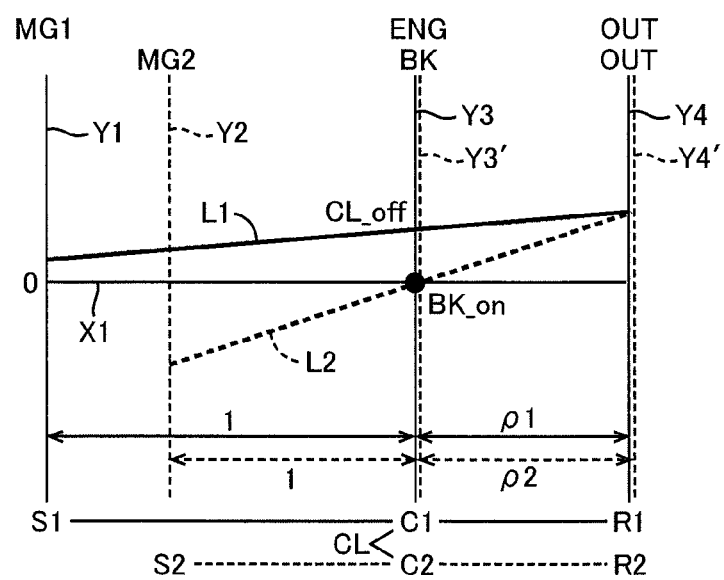
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the modes 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (first motor drive mode) in the form of the drive mode EV-1 which is established in the engaged state of the brake BK and in the released state of the clutch CL; and a mode 2 (second motor drive mode) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: a mode 3 (first hybrid drive mode) in the form of the drive mode HV-1 which is established in the engaged state of the brake BK and in the released state of the clutch CL; a mode 4 (second hybrid drive mode) in the form of the drive mode HV-2 which is established in the released state of the brake BK and in the engaged state of the clutch CL; and a mode 5 (third hybrid drive mode) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios ρ1 and ρ2 of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "ρ1". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "ρ2". In the drive system 10, the gear ratio ρ2 of the second planetary gear set 16 is higher than the gear ratio ρ1 of the first planetary gear set 14 (ρ2>ρ1). The drive modes of the drive system 10 will be described by reference to FIGS. 4-7.

The drive mode EV-1 indicated in FIG. 3 corresponds to the mode 1 (first motor drive mode) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the carriers C1 and C2 are permitted to be rotated relative to each other, so that the hybrid vehicle can be driven in the EV drive mode in which running using the second electric motor MG2 in forward and backward direction can be performed, similar to an EV (electric) drive mode which is established in a vehicle provided with a so-called "THS" (Toyota Hybrid System) and in which the clutch carrier C2 is fixed to the stationary member.

Figure 5:
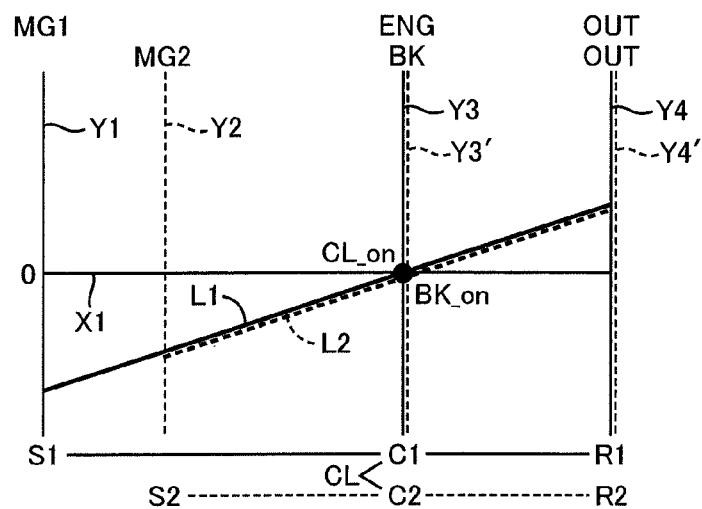
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (second motor drive mode) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear S1 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 can be driven in the forward or reverse direction by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the mode 2 is an EV drive mode which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (first hybrid drive mode) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
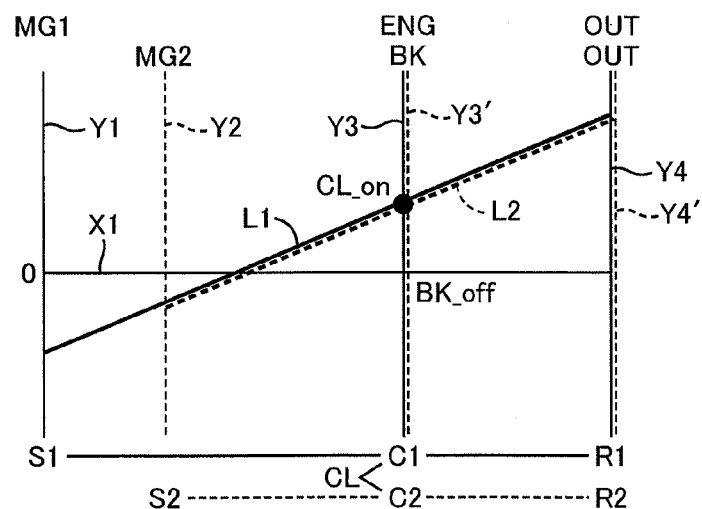
FIG. 6 is a collinear chart having straight lines which permit indication thereon of relative rotating speeds of various rotary elements of the drive system of FIG. 1, the collinear chart corresponding to the mode 4 of FIG. 3.

The drive mode HV-2 indicated in FIG. 3 corresponds to the mode 4 (second hybrid drive mode) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios $\rho1$ and $\rho2$ of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios $\rho1$ and $\rho2$. Accordingly, the drive system 10 is configured such that the gear ratio $\rho2$ of the second planetary gear set 16 is higher than the gear ratio $\rho1$ of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, so that each of the first and second electric motors MG1 and MG2 can be operated at an operating point assuring a relatively high degree of operating efficiency, and/or with a reduced degree of torque limitation due to heat generation.

For example, one of the first electric motor MG1 and second electric motor MG2 which is operable with a higher degree of operating efficiency is preferentially operated to generate a reaction force, so that the overall operating efficiency can be improved. When the hybrid vehicle is driven at a comparatively high running speed V and at a comparatively low engine speed $N_E$, for instance, the operating speed $N_{MG1}$ of the first electric motor MG1 may have a negative value, that is, the first electric motor MG1 may be operated in the negative direction. In the case where the first electric motor MG1 generates the reaction force acting on the engine 12, the first electric motor MG1 is operated in the negative direction so as to generate a negative torque with consumption of an electric energy, giving rise to a risk of reduction of the operating efficiency. In this respect, it will be apparent from FIG. 6 that in the drive system 10, the operating speed of the second electric motor MG2 indicated on the vertical line Y2 is less likely to have a negative value than the operating speed of the above-indicated first electric motor MG1 indicated on the vertical line Y1, and the second electric motor MG2 may possibly be operated in the positive direction, during generation of the reaction force. Accordingly, it is possible to improve the operating efficiency to improve the fuel economy, by preferentially controlling the second electric motor MG2 so as to generate the reaction force, while the operating speed of the first electric motor MG1 has a negative value. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 8:
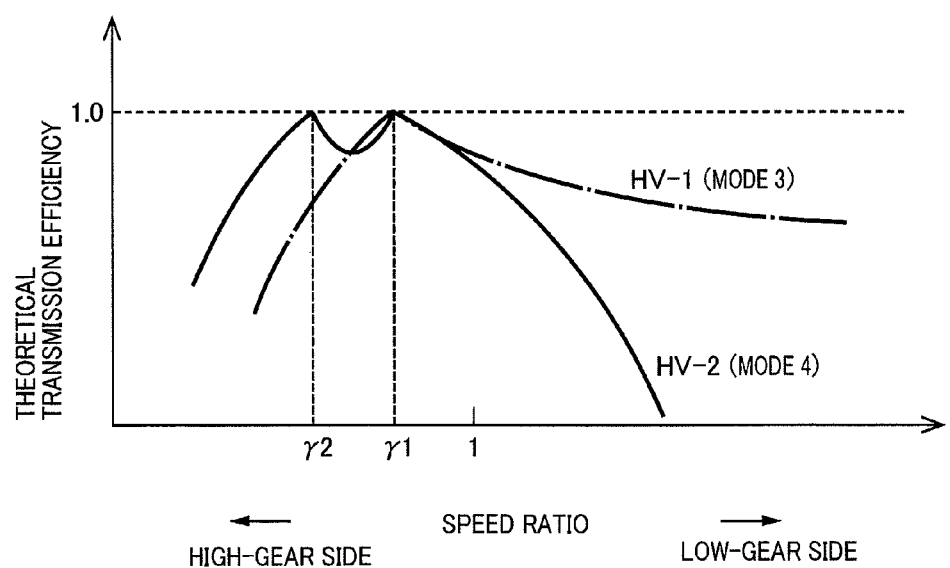
FIG. 8 is a view for explaining transmission efficiency of the drive system of FIG. 1.

FIG. 8 is the view for explaining transmission efficiency of the drive system 10, wherein a speed ratio is taken along the horizontal axis while theoretical transmission efficiency is taken along the vertical axis. The speed ratio indicated in FIG. 8 is a ratio of the input side speed of the first and second planetary gear sets 14 and 16 to the output side speed, that is, the speed reduction ratio, which is for example, a ratio of the rotating speed of the input rotary member in the form of the carrier C1 to the rotating speed of the output gear 30 (ring gears R1 and R2). The speed ratio is taken along the horizontal axis in FIG. 8 such that the left side as seen in the view of FIG. 8 is a side of high gear positions having comparatively low speed ratio values while the right side is a side of low gear positions having comparatively high speed ratio values. Theoretical transmission efficiency indicated in FIG. 8 is a theoretical value of the transmission efficiency of the drive system 10, which has a maximum value of 1.0 when an entirety of the drive force is mechanically transmitted from the first and second planetary gear sets 14 and 16 to the output gear 30, without transmission of an electric energy through the electric path.

In FIG. 8, a one-dot chain line represents the transmission efficiency of the drive system 10 placed in the mode 3 (HV-1), while a solid line represents the transmission efficiency in the mode 4 (HV-2). As indicated in FIG. 8, the transmission efficiency of the drive system 10 in the mode 3 (HV-1) has a maximum value at a speed ratio value γ1. At this speed ratio value γ1, the operating speed of the first electric motor MG1 (rotating speed of the sun gear S1) is zero, and an amount of an electric energy transmitted through the electric path is zero during generation of the reaction force, so that the drive force is only mechanically transmitted from the engine 12 and the second electric motor MG2 to the output gear 30, at an operating point corresponding to the speed ratio value γ1. This operating point at which the transmission efficiency is maximum while the amount of the electric energy transmitted through the electric path is zero will be hereinafter referred to as a "mechanical point (mechanical transmission point)". The speed ratio value γ1 is lower than "1", that is, a speed ratio on an overdrive side, and will be hereinafter referred to as a "first mechanical transmission speed ratio value γ1". As indicated in FIG. 8, the transmission efficiency in the mode 3 gradually decreases with an increase of the speed ratio from the first mechanical transmission speed ratio value γ1 toward the low-gear side, and abruptly decreases with a decrease of the speed ratio from the first mechanical transmission speed ratio value γ1 toward the high-gear side.

In the mode 4 (HV-2) of the drive system 10, the gear ratios ρ1 and ρ2 of the first planetary gear set 14 and second planetary gear set 16 having the four rotary elements in the engaged state of the clutch CL are determined such that the operating speeds of the first electric motor MG1 and second electric motor MG2 are indicated at respective different positions along the horizontal axis of the collinear chart of FIG. 6, so that the transmission efficiency in the mode 4 has a maximum value at a mechanical point at a speed ratio value γ2, as well as at the speed ratio value γ1, as indicated in FIG. 8. Namely, in the mode 4, the rotating speed of the first electric motor MG1 is zero at the first mechanical transmission speed ratio value γ1 at which the amount of the electric energy transmitted through the electric path is zero during generation of the reaction force by the first electric motor MG1, while the rotating speed of the second electric motor MG2 is zero at the speed ratio value γ2 at which the amount of the electric energy transmitted through the electric path is zero during generation of the reaction force by the second electric motor MG2. The speed ratio value γ2 will be hereinafter referred to as a "second mechanical transmission speed ratio value γ2". This second mechanical transmission speed ratio value γ2 is smaller than the first mechanical transmission speed ratio value γ1. In the mode 4, the drive system 10 has the mechanical point located on the high-gear side of the mechanical point in the mode 3.

As indicated in FIG. 8, the transmission efficiency in the mode 4 more abruptly decreases with an increase of the speed ratio on a low-gear side of the first mechanical transmission speed ratio value γ1, than the transmission efficiency in the mode 3. In a region of the speed ratio between the first mechanical transmission speed ratio value γ1 and second mechanical transmission speed ratio value γ2, the transmission efficiency in the mode 4 changes along a concave curve. In this region, the transmission efficiency in the mode 4 is almost equal to or higher than that in the mode 3. The transmission efficiency in the mode 4 decreases with a decrease of the speed ratio from the second mechanical transmission speed ratio value γ2 toward the high-gear side, but is higher than that in the mode 3. That is, the drive system placed in the mode 4 has not only the first mechanical transmission speed ratio value γ1, but also the second mechanical transmission speed ratio value γ2 on the high-gear side of the first mechanical transmission speed ratio value γ1, so that the transmission efficiency of the drive system can be improved in high-gear positions having comparatively low speed ratio values. Thus, a fuel economy during running of the vehicle at a relatively high speed is improved owing to an improvement of the transmission efficiency.

As described above referring to FIG. 8, the transmission efficiency of the drive system 10 during a hybrid running of the vehicle with an operation of the engine 12 used as the vehicle drive power source and operations of the first and second electric motors MG1 and MG2 as needed to generate a vehicle drive force and/or an electric energy can be improved by adequately switching the vehicle drive mode between the mode 3 (HV-1) and mode 4 (HV-2). For instance, the mode 3 is established in low-gear positions having speed ratio values lower than the first mechanical transmission speed ratio value γ1, while the mode 4 is established in high-gear positions having speed ratio values higher than the first mechanical transmission speed ratio value γ1, so that the transmission efficiency can be improved over a wide range of the speed ratio covering the low-gear region and the high-gear region.

Figure 7:
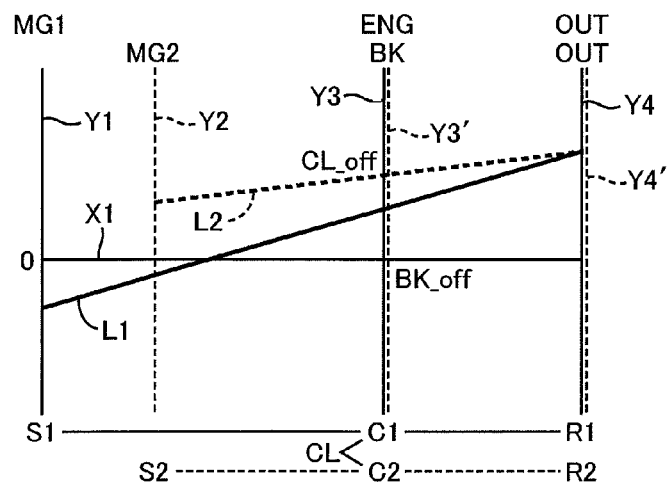
FIG. 7 is a collinear chart having straight lines which permit indication thereon of relative rotating speeds of various rotary elements of the drive system of FIG. 1, the collinear chart corresponding to the mode 5 of FIG. 3.

The drive mode HV-3 indicated in FIG. 3 corresponds to the mode 5 (third hybrid drive mode) of the drive system 10, which is preferably the hybrid drive mode in which the engine 12 is operated as the vehicle drive power source while the first electric motor MG1 is operated to generate an electric energy, with a continuous change of the speed ratio, and with an operating point of the engine 12 being moved along a predetermined optimum operating curve. In this mode 5, the engine 12 and first electric motor MG1 may be operated to generate a vehicle drive force, with the second electric motor MG2 being disconnected from a drive system. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source while the first and second electric motors MG1 and MG2 are operated as needed to generate a vehicle drive force and/or an electric energy, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 9:
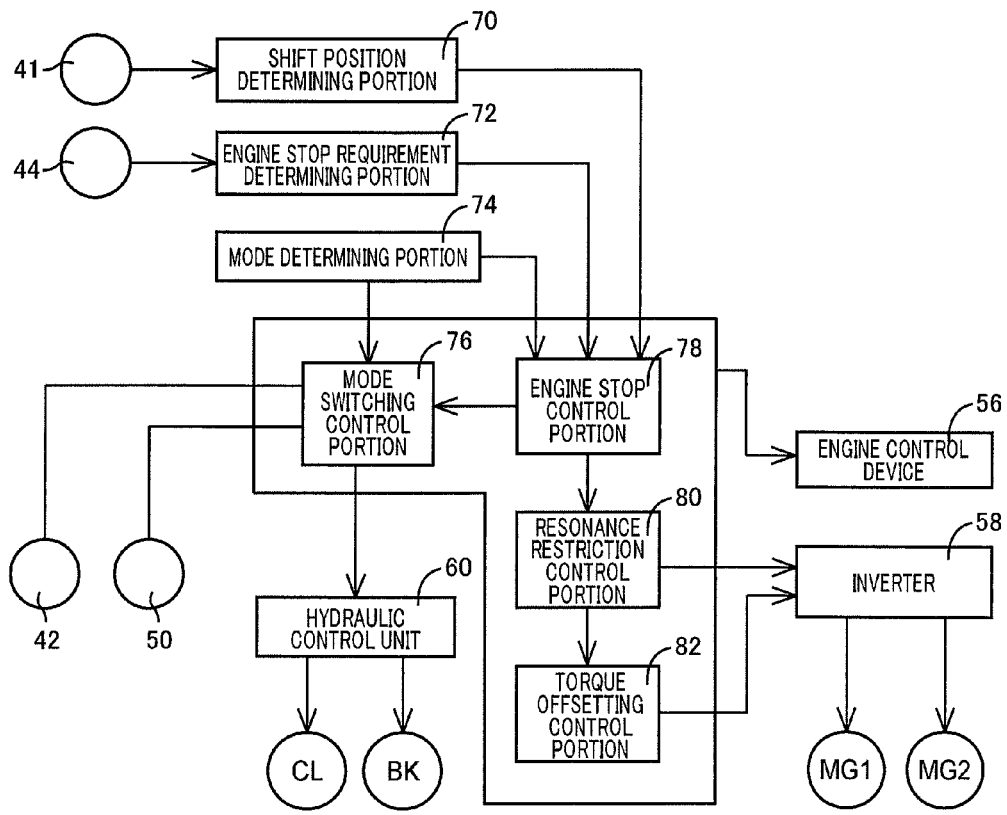
FIG. 9 is a functional block diagram for explaining major control functions of an electronic control device provided for the drive system of FIG. 1.

FIG. 9 is the functional block diagram for explaining major control functions of the electronic control device 40 as shown in FIG. 2. A shift position determining portion 70 shown in FIG. 9 is configured to determine the presently selected shift position of the manually operated shifting device 41. For instance, the shift position determining portion 70 determines whether the presently selected shift position is the parking position or not, on the basis of the shift position signal Sh received from the manually operated shifting device 41. An engine stop requirement determining portion 72 is configured to determine whether the engine 12 which has been kept in an operated state (under the control of the engine control device 56) is required to be stopped. For instance, the engine stop requirement determining portion 72 determines that the engine 12 is required to be stopped, if a required vehicle drive force represented by the accelerator pedal operation amount and the vehicle running speed has become smaller than a predetermined lower limit, if the stored electric energy amount SOC of an electric-energy storage device not shown has exceeded a charging upper limit and charging is restricted, or if an output signal of an ignition switch not shown has changed from an ON state (operating state) to operate the engine 12 to an OFF state (non-operating state) to stop the engine 12. A mode determining portion 74 is configured to determine a presently established one of the five modes consisting of the drive modes EV-1 (mode 1), EV-2 (mode 2), HV-1 (mode 3), HV-2 (mode 4) and HV-3 (mode 5), on the basis of vehicle parameters such as the vehicle running speed V, the accelerator pedal operation amount $A_{CC}$, the stored electric energy amount SOC and operating temperatures, or on the basis of output states of the engine control device 56 and the inverter 58, an output state of a mode switching control portion 76, or an already set state of an appropriate memory flag.

The mode switching control portion 76 is configured to implement a mode switching control for placing the drive system 10 in the selected one of the drive modes. For instance, the mode switching control portion 76 determines whether the drive system 10 should be placed in an electric drive mode or a hybrid drive mode, depending upon whether the operator's required vehicle drive force represented by the vehicle running speed V and the accelerator pedal operation amount $A_{CC}$ lies in a predetermined electric drive region or an engine drive region, or on the basis of a requirement based on the stored electric energy amount SOC. If the electric drive mode is selected, the mode switching control portion 76 establishes one of the drive modes EV-1 (mode 1) and EV-2 (mode 2), on the basis of the requirement based on the stored electric energy amount SOC and the operator's selection. If the hybrid drive mode is selected, the mode switching control portion 76 establishes one of the drive modes HV-1 (mode 3), HV-2 (mode 4) and HV-3 (mode 5), on the basis of the operating efficiency of the engine 12, the transmission efficiency, the required vehicle drive force, etc., so as to provide a good compromise between the vehicle drivability and the fuel economy. For example, the mode switching control portion 76 establishes the drive mode HV-1 (mode 3) at a relatively low running speed in a relatively low-gear (high speed-reduction ratio) range, the drive mode HV-2 (mode 4) at a relatively intermediate running speed in a relatively intermediate-gear (intermediate speed-reduction ratio) range, the drive mode HV-3 (mode 5) at a relatively high running speed in a relatively high-gear (low speed-reduction ratio) range. This mode switching control portion 76 releases the clutch CL and engages the brake BK through the hydraulic control unit 60, for switching the drive mode from the drive mode HV-2 (mode 4) to the drive mode HV-1 (mode 3). Namely, the mode switching control portion 76 switches the operating state from the state shown in the collinear chart of FIG. 6 to the state shown in the collinear chart of FIG. 4.

Figure 10:
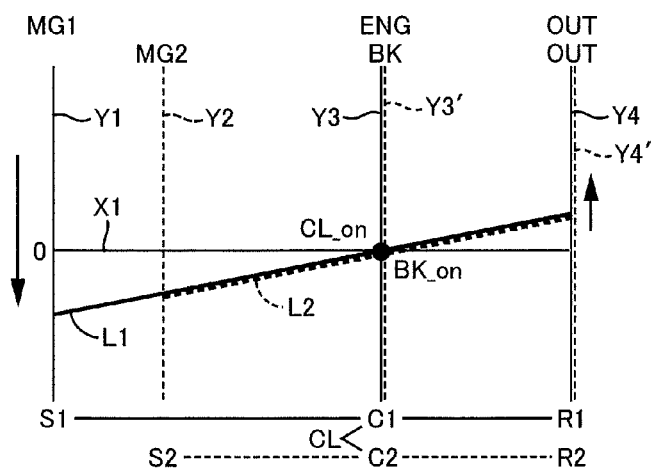
FIG. 10 is a collinear chart for explaining switching from the mode 4 shown in FIG. 6 to the mode 3 shown in FIG. 4, before stopping the engine.

An engine stop control portion 78 is configured to command the mode switching control portion 76 to release the clutch CL and engage the brake BK, for switching the drive mode from the drive mode HV-2 (mode 4) to the drive mode HV-1 (mode 3), if the engine stop requirement determining portion 72 determines that the engine is required to be stopped, while the mode determining portion 74 determines that the drive mode HV-2 (mode 4) is presently established during running of the hybrid vehicle, unless the shift position determining portion 70 determines that the parking position is established. Then, the engine stop control portion 78 commands the engine control device 56 to stop a fuel supply by a fuel injecting device into an intake pipe, and an ignition control by an igniting device, for thereby stopping the operation of the engine 12, so that reduction of the engine speed $N_E$ is initiated. Since the clutch CL is placed in the released state and the brake BK is placed in the engaged state by the mode switching control portion 76, the operating state is changed from that indicated by a solid line in the collinear chart of FIG. 4, to that indicated by a solid line in the collinear chart of FIG. 10, with the engine speed $N_E$ being zeroed as a result of stopping of the engine 12.

In the process of reduction of the engine speed $N_E$ as a result of stopping of the engine 12, the engine speed $N_E$ drops through a predetermined resonance band, so that a resonance may be generated in a power transmitting system. This power transmitting system is a power transmitting line from the vehicle drive power source to the drive wheels, namely, a so-called "drive line". In the hybrid vehicle provided with the drive system 10, the power transmitting system is a power transmitting line including the first planetary gear set 14, the second planetary gear set 16, the input shaft 28, the output gear 30, the damper, the differential gear device, the drive wheels and the vehicle body, which are disposed in a power transmitting path from the vehicle drive power source in the form of the engine 12, the first electric motor MG1 and the second electric motor MG2, to the drive wheels.

A resonance restriction control portion 80 is configured to positively reduce the operating speed $N_E$ of the engine 12, that is, to increase a rate of reduction of the engine speed $N_E$, by using a torque of the first electric motor MG1, so that the engine speed $N_E$ rapidly drops through the resonance band. The resonance restriction control portion 80 initiates this positive reduction of the engine speed $N_E$, at a moment at which a possibility of generation of a resonance in the power transmitting system is detected on the basis of the operating speed $N_E$ of the engine 12 and according to a predetermined relationship, namely, at a moment at which initiation of generation of the resonance is forecasted, more specifically, at a moment at which the engine speed $N_E$ has dropped below a predetermined determination value of about 400 rpm, for example, at which the generation of a resonance is forecasted by experimentation.

A torque offsetting control portion 82 is configured to command the second electric motor MG2 to generate an offsetting torque (positive torque) for offsetting a reaction force acting on the output gear 30 rotating together with the ring gears R1 and R2 during positive reduction of the operating speed $N_E$ of the engine 12 with the operation of the first electric motor MG1. This reaction force which would result in a temporary rise of the rotating speed of the output gear 30 is offset because it is desired to run the hybrid vehicle with a constant drive force.

Figure 11:
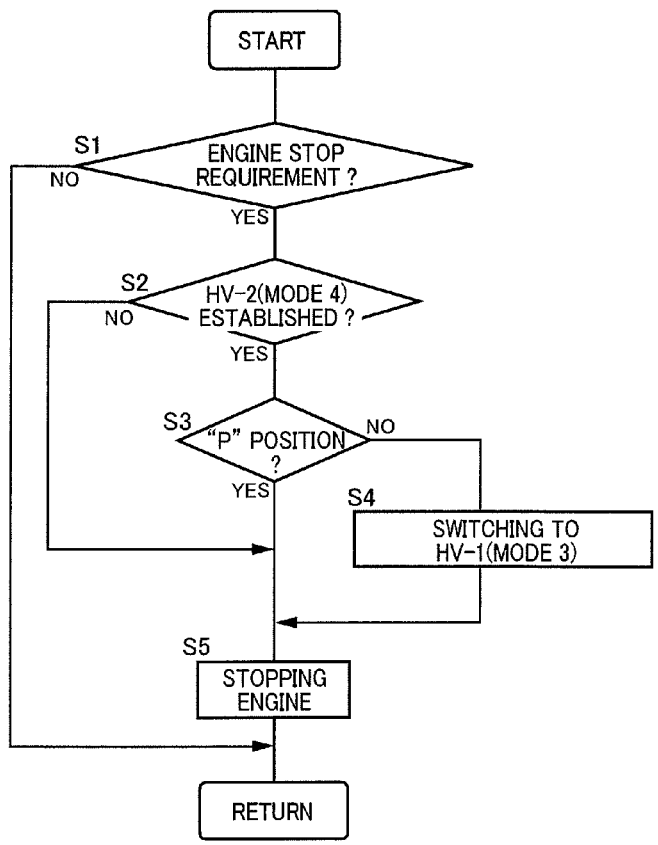
FIG. 11 is a flow chart for explaining a major portion of a engine stopping control implemented by the electronic control device provided for the drive system of FIG. 1.
Figure 12:
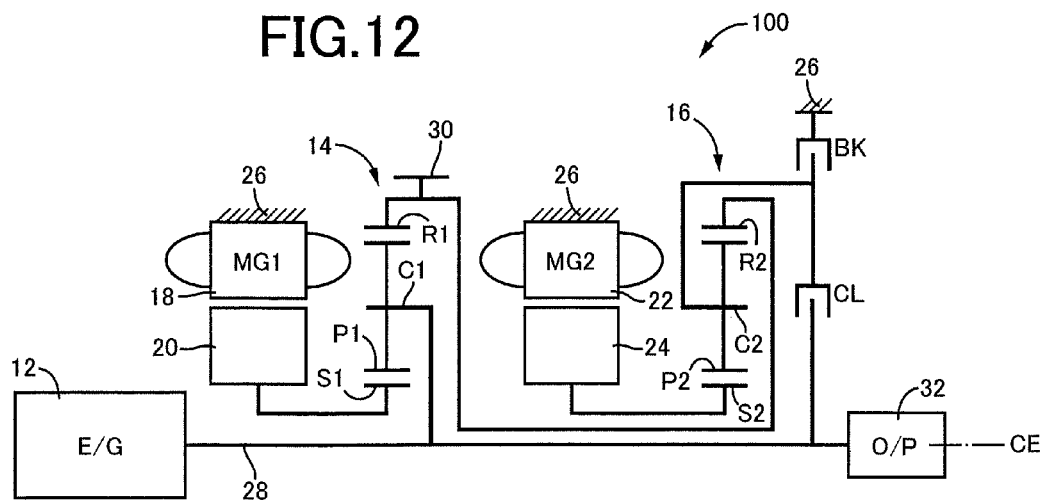
FIG. 12 is a schematic view for explaining an arrangement of a hybrid vehicle drive system according to another preferred embodiment of this invention.
Figure 13:
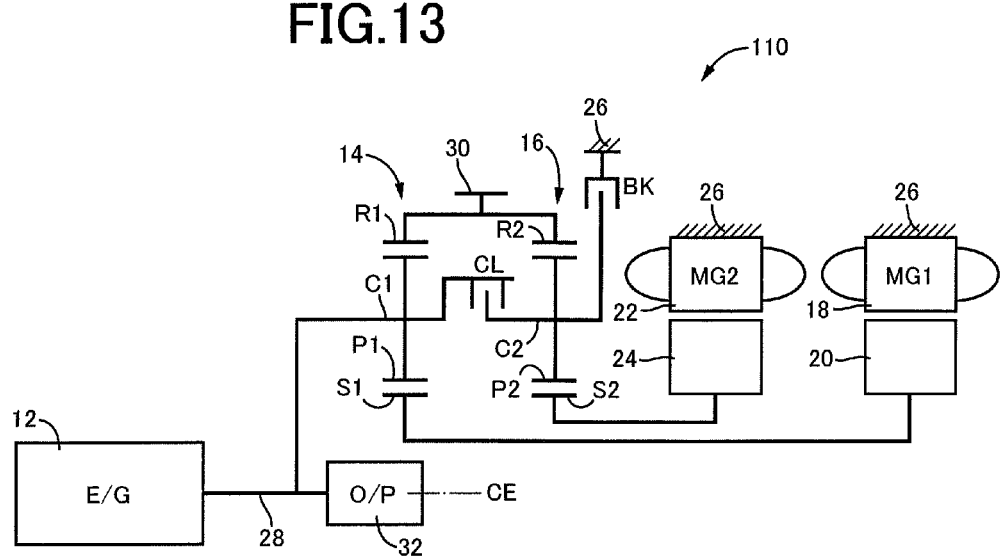
FIG. 13 is a schematic view for explaining an arrangement of a hybrid vehicle drive system according to a further preferred embodiment of this invention.
Figure 14:
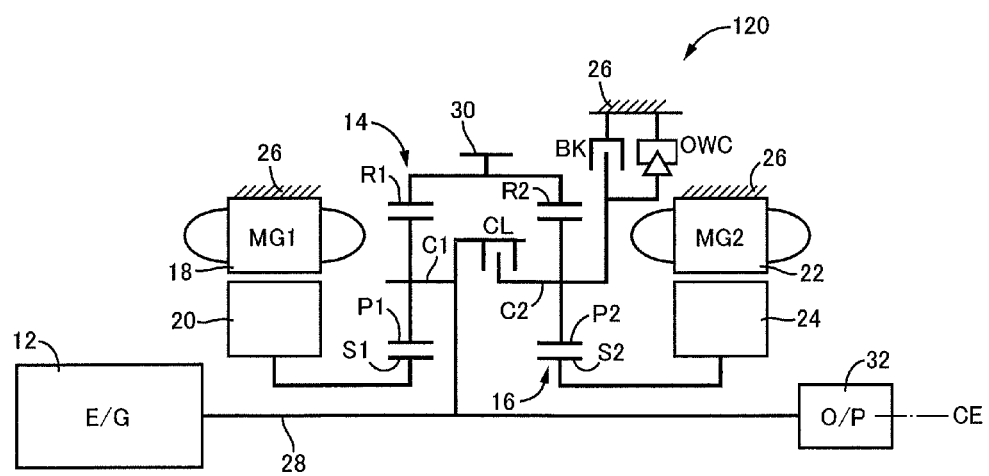
FIG. 14 is a schematic view for explaining an arrangement of a hybrid vehicle drive system according to a still further preferred embodiment of this invention.
Figure 15:
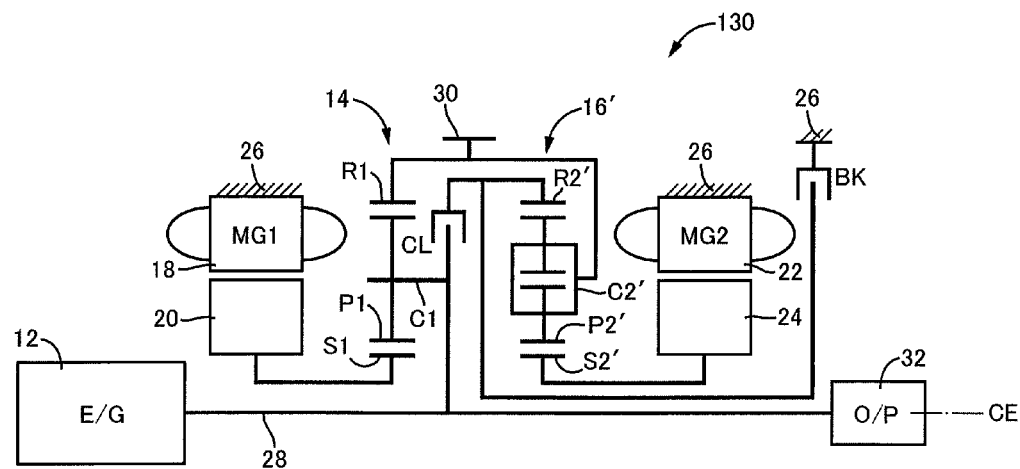
FIG. 15 is a schematic view for explaining an arrangement of a hybrid vehicle drive system according to a yet further preferred embodiment of this invention.
Figure 16:
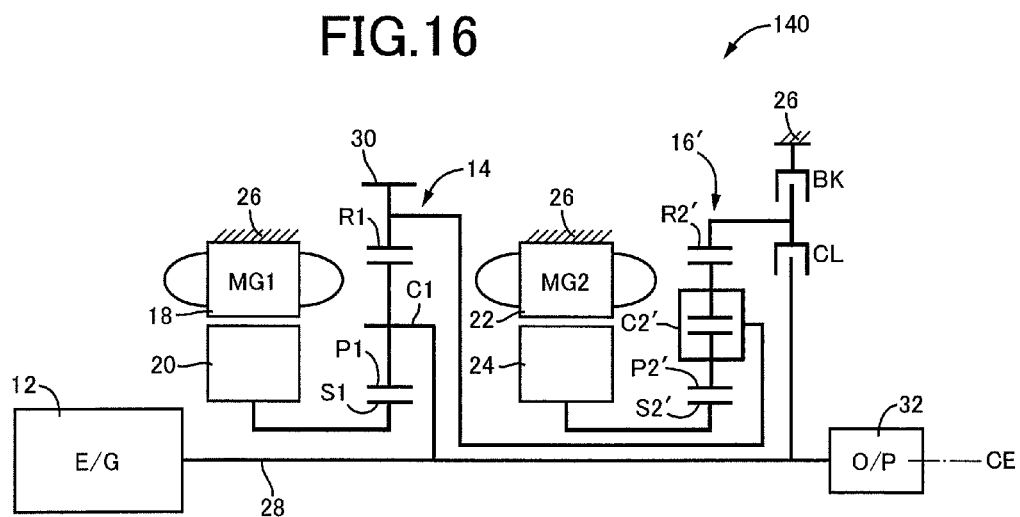
FIG. 16 is a schematic view for explaining an arrangement of a hybrid vehicle drive system according to still another preferred embodiment of this invention.
Figure 17:
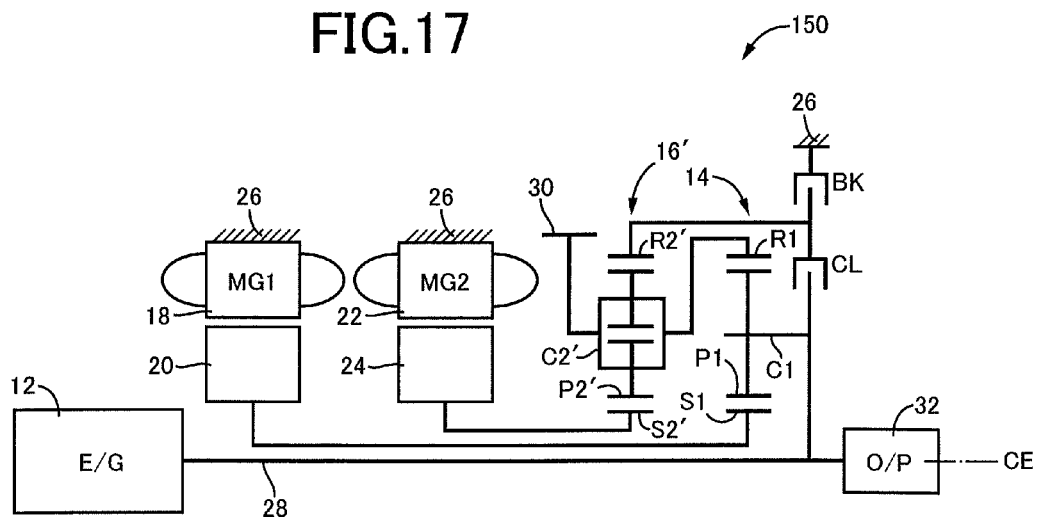
FIG. 17 is a schematic view for explaining an arrangement of a hybrid vehicle drive system according to yet another preferred embodiment of this invention.

FIG. 11 is the flow chart for explaining a major portion of a control operation of the electronic control device 40 of FIG. 2. The control operation is repeatedly performed with a predetermined cycle time.

The control operation is initiated with a step S1 ("step" being hereinafter omitted) corresponding to the engine stop requirement determining portion 72, to determine whether the engine is required to be stopped while the hybrid vehicle is running or held stationary. If a negative determination is obtained in S1, the present routine is terminated. If an affirmative determination is obtained, the control flow goes to S2 corresponding to the mode determining portion 74, to determine whether the vehicle is running in the drive mode HV-2 (mode 4). If a negative determination is obtained in S2, the control flow goes to S5 corresponding to the engine stop control portion 78, to stop the operation of the engine 12, so that reduction of the engine speed $N_E$ is initiated. If an affirmative determination is obtained in S2, the control flow goes to S3 corresponding to the shift position determining portion 70, to determine whether the presently selected shift position is the "P" position. If an affirmative determination is obtained in S3, the control flow goes to S5 corresponding to the engine stop control portion 78, to stop the operation of the engine 12, so that the reduction of the engine speed $N_E$ is initiated.

If a negative determination is obtained in S3, the control flow goes to S4 corresponding to the engine stop control portion 78, to release the clutch CL and engage the brake BK, for switching the drive mode from the drive mode HV-2 (mode 4) to the drive mode HV-1 (mode 3), and then goes to S5 corresponding to the engine stop control portion 78, the resonance restriction control portion 80 and the torque offsetting control portion 82, to positively reduce the operating speed $N_E$ of the engine 12, by using a torque of the first electric motor MG1, so that the operation of the engine 12 is stopped, and the reduction of the engine speed $N_E$ is initiated. The positive reduction of the operating speed $N_E$ of the engine 12, that is, an increase of the rate of reduction of the engine speed $N_E$ is further initiated by using the torque of the first electric motor MG1 during the reduction of the engine speed $N_E$ when the engine speed $N_E$ has dropped below the predetermined determination value at which the generation of a resonance is forecasted by experimentation, whereby the engine speed $N_E$ rapidly drops through the resonance band. Since the clutch CL is placed in the released state in the process of reduction of the engine speed $N_E$ according to the requirement for stopping the engine 12, the torque of the first electric motor MG1 used for the positive or rapid reduction of the engine speed $N_E$ can be offset by the torque of the second electric motor MG2.

The drive control device 40 for the hybrid vehicle according to the present embodiment described above is provided with: the first differential mechanism in the form of the first planetary gear set 14 and the second differential mechanism in the form of the second planetary gear set 16, 16' which have the four rotary elements as a whole when the clutch CL is placed in the engaged state (and thus the first planetary gear set 14 and the second planetary gear set 16, 16' are represented as the four rotary elements in the collinear charts such as FIGS. 4-7); and the engine 12, the first electric motor MG1, the second electric motor MG2 and the output rotary member in the form of the output gear 30, which are respectively connected to the four rotary elements. One of the four rotary elements is constituted by the rotary element of the first differential mechanism and the rotary element of the second differential mechanism which are selectively connected to each other through the clutch CL, and one of the rotary elements of the first and second differential mechanisms which are selectively connected to each other through the clutch CL is selectively fixed to the stationary member in the form of the housing 26 through the brake BK. The drive system is configured to switch the hybrid drive mode from the second hybrid drive mode (HV-2) to the first hybrid drive mode (HV-1), before stopping the engine 12 according to a requirement to stop the engine 12 in the second hybrid drive mode. Accordingly, the second rotary element (carrier C1) of the first differential mechanism (first planetary gear set 14) and one (carrier C2) of the second and third rotary elements of the second differential mechanism (second planetary gear set 16) not connected to the third rotary element of the first differential mechanism, which rotary elements (carriers C1 and C2) have been connected to each other through the clutch CL, are disconnected from each other, so that the unexpected increase of the drive force transmitted to the output rotary member (output gear 30) upon positive reduction of the engine speed $N_E$ with an operation of the first electric motor can be offset (cancelled) by the second electric motor MG2 an output torque of which is temporarily reduced to hold the vehicle drive torque constant. Thus, it is possible to prevent the drawback of the unexpected temporary increase of the vehicle drive torque.

The drive control device 40 for the hybrid vehicle according to the present embodiment includes a manually operated device (manually operated shifting device 41) for manually selecting one of the drive position permitting the hybrid vehicle to run, and the parking position for mechanically inhibiting the running of the hybrid vehicle. The engine 12 is stopped with the hybrid vehicle being kept in the second hybrid drive mode (HV-2), if the parking position is selected by the manually operated device. Accordingly, the drive torque which is transmitted to the output rotary member in the form of the output gear 30 and which is unexpectedly increased as a result of the positive reduction of the engine speed $N_E$ with the operation of the first electric motor MG1 does not cause the hybrid vehicle to be run, since the running of the hybrid vehicle is mechanically inhibited by the parking lock device 62.

The drive control device 40 for the hybrid vehicle according to the present embodiment is configured to initiate the positive reduction of the engine speed $N_E$ with an operation of the first electric motor MG1 when the engine speed has dropped below the predetermined lower limit, and to control the second electric motor MG2 so as to offset the reaction force which acts on the output rotary member in the form of the output gear 30 as a result of the positive reduction of the engine speed $N_E$ by the first electric motor MG1. Accordingly, the drive torque which is transmitted to the output rotary member and which is unexpectedly increased as a result of the positive reduction of the engine speed $N_E$ with the operation of the first electric motor MG1 does not cause the hybrid vehicle to be run, since the running of the hybrid vehicle is mechanically inhibited.

In the drive system 10 of the hybrid vehicle according to the present embodiment, the first planetary gear set 14 is provided with the first rotary element in the form of the sun gear S1 connected to the first electric motor MG1, the second rotary element in the form of the carrier C1 connected to the engine 12, and the third rotary element in the form of the ring gear R1 connected to the output gear 30, while the second planetary gear set 16 is provided with the first rotary element in the form of the sun gear S2 connected to the second electric motor MG2, the second rotary element in the form of the carrier C2, and the third rotary element in the form of the ring gear R2, one of the carrier C2 and the ring gear R2 being connected to the ring gear R1 of the first planetary gear set 14, and the clutch CL is configured to selectively connect the carrier C1 of the first planetary gear set 14 and the other of the carrier C2 and the ring gear R2 which is not connected to the ring gear R1 of the first planetary gear set 14, to each other, while the brake BK is configured to selectively fix the other of the carrier C2 and the ring gear R2 which is not connected to the ring gear R1, to the stationary member in the form of the housing 26. Accordingly, the drive control device 40 can be used to control the hybrid vehicle having a highly practical arrangement.

Other preferred embodiments of the present invention will be described in detail by reference to the drawings. In the following description, the same reference signs will be used to identify the same elements in the different embodiments, which will not be described redundantly.

Second Embodiment

FIGS. 12-17 are the schematic views for explaining arrangements of respective hybrid vehicle drive systems 100, 110, 120, 130, 140 and 150 according to other preferred modes of this invention used instead of the hybrid vehicle drive system 10 of the previous embodiment. The hybrid vehicle drive control device of the present invention is also applicable to drive systems such as the drive system 100 shown in FIG. 12 and the drive system 110 shown in FIG. 13, which have respective different arrangements of the first electric motor MG1, first planetary gear set 14, second electric motor MG2, second planetary gear set 16, clutch CL and brake BK in the direction of the center axis CE. The present hybrid vehicle drive control device is also applicable to drive systems such as the drive system 120 shown in FIG. 14, which have a one-way clutch OWC disposed between the carrier C2 of the second planetary gear set 16 and the stationary member in the form of the housing 26, in parallel with the brake BK, such that the one-way clutch OWC permits a rotary motion of the carrier C2 relative to the housing 26 in one of opposite directions and inhibits a rotary motion of the carrier C2 in the other direction. The present hybrid vehicle drive control device is further applicable to drive systems such as the drive system 130 shown in FIG. 15, the drive system 140 shown in FIG. 16 and the drive system 150 shown in FIG. 17, which is provided with a second differential mechanism in the form of a second planetary gear set 16' of a double-pinion type, in place of the second planetary gear set 16 of a single-pinion type. This second planetary gear set 16' is provided with rotary elements (elements) consisting of a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'.

Each of the hybrid vehicle drive systems 100, 110, 120, 130, 140 and 150 according to the present second embodiment is provided with: a first differential mechanism in the form of the first planetary gear set 14 having a first rotary element in the form of the sun gear S1 connected to the first electric motor MG1, a second rotary element in the form of the carrier C1 connected to the engine 12, and a third rotary element in the form of the ring gear R1 connected to a output rotary member in the form of the output gear 30; a second differential mechanism in the form of the second planetary gear set 16 (16') having a first rotary element in the form of the sun gear S2 (S2') connected to the second electric motor MG2, a second rotary element in the form of the carrier C2 (C2') and a third rotary element in the form of the ring gear R2 (R2'), one of the carrier C2 (C2') and the ring gear R2 (R2') being connected to the ring gear R1 of the first planetary gear set 14; the clutch CL for selectively connecting the carrier C1 of the first planetary gear set 14 and the other of the carrier C2 (C2') and the ring gear R2 (R2') which is not connected to the ring gear R1, to each other; and the brake BK for selectively connecting the other of the carrier C2 (C2') and the ring gear R2 (R2') which is not connected to the ring gear R1, to a stationary member in the form of the housing 26. Accordingly, the electronic control device 40 applied to the present second embodiment has the same advantages as the first embodiment described above.

Third Embodiment

Figure 18:
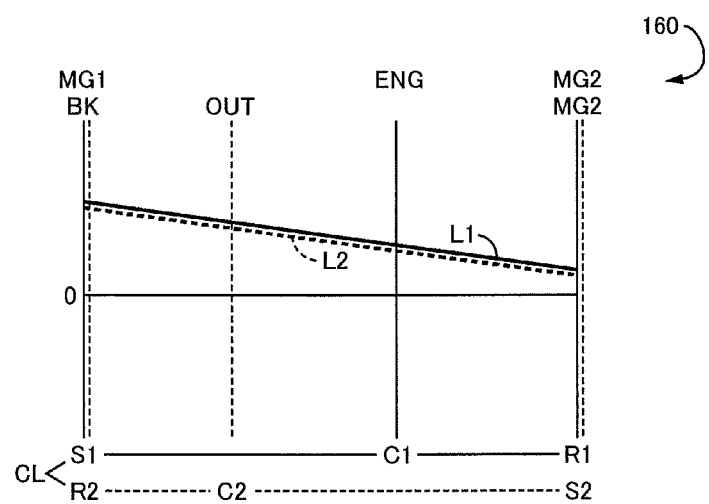
FIG. 18 is a collinear chart for explaining an arrangement and an operation of a hybrid vehicle drive system according to another preferred embodiment of this invention.
Figure 19:
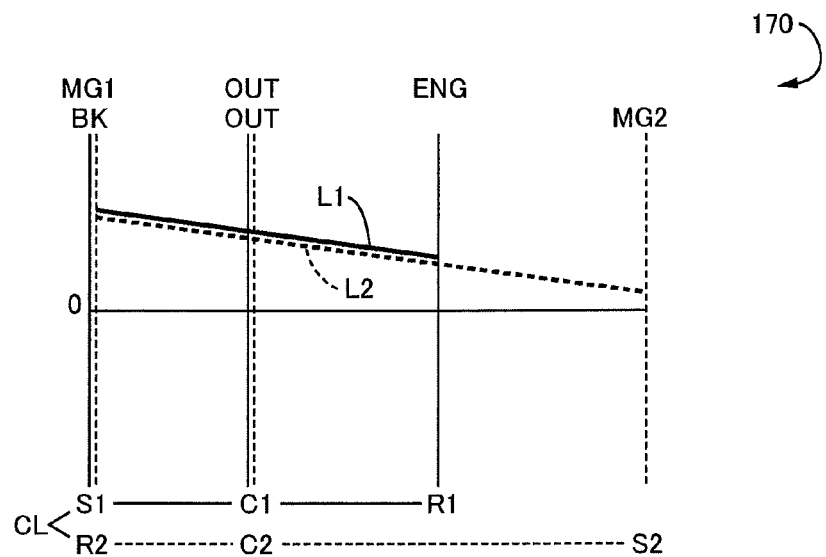
FIG. 19 is a collinear chart for explaining an arrangement and an operation of a hybrid vehicle drive system according to a further preferred embodiment of this invention.
Figure 20:
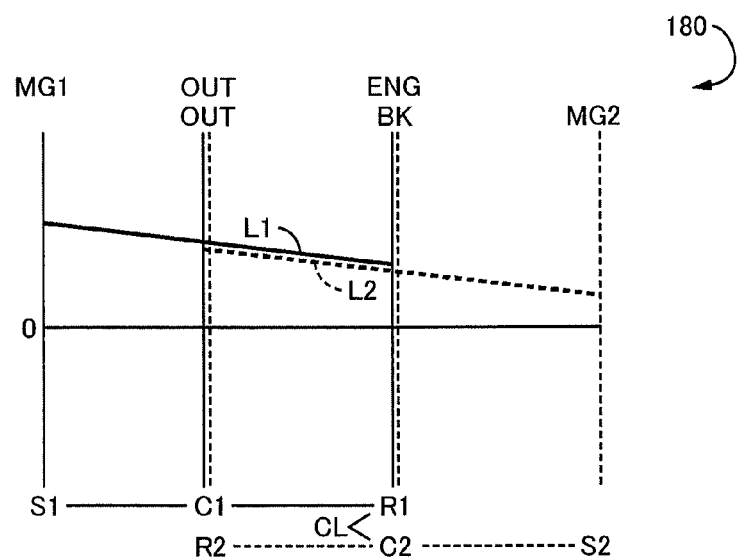
FIG. 20 is a collinear chart for explaining an arrangement and an operation of a hybrid vehicle drive system according to a still further preferred embodiment of this invention.

FIGS. 18-20 are the collinear charts for explaining arrangements and operations of respective hybrid vehicle drive systems 160, 170 and 180 according to other preferred modes of this invention in place of the drive system 10. In FIGS. 18-20, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2, as in FIGS. 4-7. In the drive system 160 for the hybrid vehicle shown in FIG. 18, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The ring gear R1 and the sun gear S2 are connected to each other. In the drive system 170 for the hybrid vehicle shown in FIG. 19, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The carriers C1 and C2 are connected to each other. In the drive system 180 for the hybrid vehicle shown in FIG. 20, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2, to the housing 26 through the brake BK, and to the output gear 30. The ring gear R1 and the carrier C2 are selectively connected to each other through the clutch CL. The carrier C1 and ring gear R2 are connected to each other.

The drive systems for the hybrid vehicle shown in FIGS. 18-20 are identical with each other in that each of these drive systems for the hybrid vehicle is provided with the first differential mechanism in the form of the first planetary gear set 14 and the second differential mechanism in the form of the second planetary gear set 16, 16', which have four rotary elements (whose relative rotating speeds are represented) in the collinear chart, and is further provided with the first electric motor MG1, second electric motor MG2, engine 12 and output rotary member (output gear 30) which are connected to the respective four rotary elements. In these drive systems for the hybrid vehicle, one of the four rotary elements is constituted by the rotary element of the first planetary gear set 14 and the rotary element of the second planetary gear set 16, 16' which are selectively connected to each other through the clutch CL, and the rotary element of the second planetary gear set 16, 16' selectively connected to the rotary element of the first planetary gear set 14 through the clutch CL is selectively fixed to the housing 26 as the stationary member through the brake BK, as in the drive system for the hybrid vehicle shown in FIGS. 4-7. Namely, the hybrid vehicle drive control device of the present invention described above by reference to FIG. 9 and the other figures is suitably applicable to the drive systems shown in FIGS. 18-20. Accordingly, the electronic control device 40 applied to the present third embodiment has the same advantages as the first embodiment described above.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10, 100, 110, 120, 130, 140, 150: Hybrid vehicle drive system
12: Engine 14: First planetary gear set (First differential mechanism)
16, 16': Second planetary gear set (Second differential mechanism)
18, 22: Stator 20, 24: Rotor 26: Housing (Stationary member)
28: Input shaft 30: Output gear (Output rotary member)
40: Electronic control device (Drive control device)
70: Shift position determining portion
72: Engine stop requirement determining portion
74: Mode determining portion
76: mode switching control portion
78: Engine stop control portion
80: Resonance restriction control portion
82: Torque offsetting control portion
BK: Brake CL: Clutch C1, C2, C2': Carrier (Second rotary element)
MG1: First electric motor MG2: Second electric motor
R1, R2, R2': Ring gear (Third rotary element)
S1, S2, S2': Sun gear (First rotary element)

The invention claimed is:

1. A drive control device for a hybrid vehicle provided with: a differential device which includes a first differential mechanism and a second differential mechanism and which has four rotary elements; and an engine, a first electric motor, a second electric motor and an output rotary member which are respectively connected to said four rotary elements, and wherein one of said four rotary elements is constituted by a rotary component of said first differential mechanism and a rotary component of said second differential mechanism which are selectively connected to each other through a clutch, and one of the rotary components of said first and second differential mechanisms which are selectively connected to each other through said clutch is selectively fixed to a stationary member through a brake, said hybrid vehicle being selectively placed in one of at least two drive modes including a first hybrid drive mode in which said brake is placed in an engaged state while said clutch is placed in a released state, and a second hybrid drive mode in which said brake is placed in a released state while said clutch is placed in an engaged state, said drive control device comprising:
an engine stop control portion configured to switch the hybrid drive mode from said second hybrid drive mode to said first hybrid drive mode, before initiation of an engine stop control that is executed for stopping said engine according to a requirement to stop said engine in said second hybrid drive mode, such that the engine stop control is executed during said first hybrid drive mode in which said brake is placed in the engaged state while said clutch is placed in the released state;
a resonance restriction control portion configured to initiate positive reduction of an operating speed of said engine with an operation of said first electric motor when said operating speed of the engine has dropped below a predetermined determination value, such that the positive reduction of the operating speed of said engine is made during said first hybrid drive mode in which said brake is placed in the engaged state while said clutch is placed in the released state; and
a torque offsetting control portion configured to control said second electric motor so as to offset a reaction force which acts on said output rotary member as a result of the positive reduction of the operating speed of the engine by the first electric motor, such that said second electric motor is controlled so as to offset the reaction force during said first hybrid drive mode in which said brake is placed in the engaged state while said clutch is placed in the released state.

2. The drive control device according to claim 1, wherein said hybrid vehicle includes a manually operated device for manually selecting one of a drive position permitting the hybrid vehicle to run, and a parking position for mechanically inhibiting the running of the hybrid vehicle,
and wherein said engine stop control portion stops said engine with the hybrid vehicle being kept in said second hybrid drive mode, if said parking position is selected by said manually operated device.

3. The drive control device according to claim 1, wherein said first differential mechanism is provided with a first rotary element connected to said first electric motor, a second rotary element connected to said engine, and a third rotary element connected to said output rotary member, while said second differential mechanism is provided with a first rotary element connected to said second electric motor, a second rotary element, and a third rotary element, one of the second and third rotary elements of the second differential mechanism being connected to the third rotary element of said first differential mechanism, and wherein said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotary elements of said second differential mechanism which is not connected to the third rotary element of said first differential mechanism, to the stationary member.

4. The control device according to claim 1, wherein at least one of said first and second electric motors is operable to receive a reaction force corresponding to an output of said engine during said second hybrid drive mode in which said brake is placed in the released state while said clutch is placed in the engaged state, and wherein said second electric motor is operated to receive the reaction force during said second hybrid drive mode, when an operating speed of said first electric motor has a negative value.

* * * * *